US009499684B2

(12) United States Patent
Brandl et al.

(10) Patent No.: US 9,499,684 B2
(45) Date of Patent: *Nov. 22, 2016

(54) ALKYL OR DIALKYL-SEMICARBAZONE AS A HARDENER FOR EPOXY RESIN

(71) Applicant: ALZCHEM AG, Trostberg (DE)

(72) Inventors: Monika Brandl, Tacherting (DE); Martin Ebner, Kissing (DE); Hans-Peter Krimmer, Kirchweidach (DE)

(73) Assignee: ALZCHEM AG, Trostberg (DE)

( * ) Notice: Subject to any disclaimer, the term of this patent is extended or adjusted under 35 U.S.C. 154(b) by 257 days.

This patent is subject to a terminal disclaimer.

(21) Appl. No.: 14/357,049

(22) PCT Filed: Nov. 14, 2012

(86) PCT No.: PCT/EP2012/072588
§ 371 (c)(1),
(2) Date: May 8, 2014

(87) PCT Pub. No.: WO2013/072354
PCT Pub. Date: May 23, 2013

(65) Prior Publication Data
US 2014/0308863 A1    Oct. 16, 2014

(30) Foreign Application Priority Data

Nov. 15, 2011  (DE) ........................ 10 2011 118 501

(51) Int. Cl.
| | | |
|---|---|---|
| C08L 63/00 | (2006.01) | |
| C08L 61/20 | (2006.01) | |
| C08G 59/40 | (2006.01) | |
| C08G 59/44 | (2006.01) | |
| C08G 59/46 | (2006.01) | |
| C08G 12/14 | (2006.01) | |
| C08K 7/02 | (2006.01) | |
| C08K 5/21 | (2006.01) | |
| C08K 5/29 | (2006.01) | |
| C08K 5/30 | (2006.01) | |
| C08K 7/06 | (2006.01) | |
| C08K 7/14 | (2006.01) | |

(52) U.S. Cl.
CPC ............... *C08K 7/02* (2013.01); *C08G 59/40* (2013.01); *C08G 59/4014* (2013.01); *C08K 5/21* (2013.01); *C08K 5/29* (2013.01); *C08K 5/30* (2013.01); *C08K 7/06* (2013.01); *C08K 7/14* (2013.01); *C08L 63/00* (2013.01); *Y10T 442/10* (2015.04); *Y10T 442/2951* (2015.04)

(58) Field of Classification Search
CPC ............... C08G 59/4014; C08L 63/00
See application file for complete search history.

(56) References Cited

U.S. PATENT DOCUMENTS

| | | |
|---|---|---|
| 2,993,044 A | 7/1961 | Applegath et al. |
| 3,274,231 A | 9/1966 | Kobayashi |
| 3,386,955 A | 6/1968 | Nawakowski et al. |
| 3,386,956 A | 6/1968 | Nawakowski et al. |
| 3,454,669 A | 7/1969 | Laudise |
| 3,717,612 A | 2/1973 | Babayan |
| 3,753,680 A | 8/1973 | Tilles |
| 3,789,071 A | 1/1974 | Babayan |
| 3,885,042 A | 5/1975 | Mulder |
| 4,283,520 A | 8/1981 | Moser et al. |
| 4,360,649 A | 11/1982 | Kamio et al. |
| 4,410,457 A | 10/1983 | Fujimura et al. |
| 5,043,102 A | 8/1991 | Chen et al. |
| 5,214,098 A | 5/1993 | Setiabudi et al. |
| 7,750,107 B2 | 7/2010 | Antelmann et al. |
| 2002/0007022 A1 | 1/2002 | Oosedo et al. |
| 2007/0027274 A1 | 2/2007 | Antelmann et al. |
| 2009/0197051 A1 | 8/2009 | Swan et al. |
| 2011/0027695 A1 | 2/2011 | Shimizu et al. |
| 2013/0079488 A1 | 3/2013 | Hitzler et al. |
| 2014/0357762 A1 | 12/2014 | Eichhorn et al. |
| 2016/0083575 A1 | 3/2016 | Hitzler et al. |

FOREIGN PATENT DOCUMENTS

| | | |
|---|---|---|
| CN | 101709195 | 5/2010 |
| DE | 01720200 | 6/1971 |
| DE | 2304789 | 8/1973 |
| DE | 2236339 | 2/1974 |
| DE | 3217723 | 12/1982 |
| DE | 10324486 | 12/2004 |
| DE | 102010020882 | 11/2011 |
| EP | 298742 | 1/1989 |
| EP | 429395 | 5/1991 |
| EP | 0462456 | 12/1991 |
| EP | 603131 | 6/1994 |
| EP | 2295483 | 3/2011 |

(Continued)

OTHER PUBLICATIONS

Hadzi et al., "The NH stretching band and the molecular configuration of acyl hydrazones and semicarbazones," Spectrochimica Acta. 1967, vol. 23A, pp. 571-577.*
HCAPLUS Accession No. 2010:633650, Derwent accession No. 2010-F96374 and abstract for Chinese Patent No. 101709195 A, May 19, 2010, Gao et al., six pages.
U.S. Appl. No. 14/357,030, Non-Final Office Action, Oct. 16, 2015, 12 pages.
U.S. Appl. No. 13/643,119, Final Office Action, Jan. 13, 2016, 11 pages.

(Continued)

*Primary Examiner* — Randy Gulakowski
*Assistant Examiner* — Ha S Nguyen
(74) *Attorney, Agent, or Firm* — Kilpatrick Townsend & Stockton LLP

(57) ABSTRACT

The invention relates to the use of alkyl or dialkyl-semicarbazone as a hardener for hardening epoxy resin and to a method for controlling the hardening of epoxy resin and epoxy resin compounds.

19 Claims, No Drawings

(56) References Cited

FOREIGN PATENT DOCUMENTS

| EP | 2306570 | 4/2011 |
| --- | --- | --- |
| FR | 1570670 | 6/1969 |
| GB | 1153639 | 5/1969 |
| GB | 2300187 | 10/1996 |
| JP | 60011458 | 1/1985 |
| JP | 2003039505 | 2/2003 |
| JP | 2004256729 | 9/2004 |
| JP | 2006152170 | 6/2006 |
| JP | 2008204895 | 9/2008 |
| SU | 1502585 | 8/1989 |
| SU | 1574618 | 6/1990 |
| SU | 1574618 A1 * | 6/1990 |
| WO | 9527761 | 10/1995 |
| WO | 2004106402 | 12/2004 |
| WO | 2007062853 | 6/2007 |
| WO | 2011144659 | 11/2011 |

OTHER PUBLICATIONS

U.S. Appl. No. 13/643,119, Non-Final Office Action, Jun. 5, 2015, 10 pages.
Abendroth et al., "Structure-isomeric hydrazones", Angewandte Chemie, vol. 71, 1959, p. 283, 1 page.
Adams et al., "Do Deprotonated Semicarbazones Undergo the Negative-ion Beckmann Rearrangement in the Gas Phase?", Rapid Communications in Mass Spectrometry, vol. 4, No. 8, Aug. 1990, pp. 275-276, 2 pages.
Chandra et al., "Manganese(II) Complexes of Cyclohexanone Semicarbazone and Cyclohexanone Thiosemicarbazone", Gazetta Chimica Italiana, vol. 110, 1980, pp. 207-210, 3 pages.
Chanley et al., "Long-cain Aliphatic Semicarbazides", J. Am. Chem. Soc., vol. 75, No. 20, 1953, pp. 5113-5114, 2 pages.
DE102010020882.5, Search Report, May 18, 2010, 2 pages (No Translation Available).
Hadzi et al., "The NH Stretching Band and the Molecular Configuration of Acyl Hydrazones and Semicarbazones", Spectrochimica Acta Part A: Molecular Spectroscopy, vol. 23, Issue 3, Mar. 1967, pp. 571-577, 7 pages.
Lee et al., Handbook of Epoxy Resins, 1967, pp. 10-16, 3 pages.
Naves et al., "Sur les spectres d'absorption infrarouge, entre 2,5 et 16, de semicarbazones", Helvetica Chimica Acta, vol. 50, Issue 6, 1967, pp. 1461-1468, 9 pages.
Pandeya et al., "Synthesis and Biological Activity of Substituted Aryl Semicarbazones", Acta Ciencia Indica, vol. XXXIII C; No. 1, 2007, pp. 85-92, 8 pages.
PCT/EP2011/058042, International Search Report, Aug. 29, 2011, 3 pages.
U.S. Appl. No. 14/357,030, Final Office Action, Mar. 16, 2016, 8 pages.
U.S. Appl. No. 14/954,560, Non-Final Office Action, Jan. 15, 2016, 13 pages.
German Application No. DE102011118760.0, German Search Report dated Aug. 14, 2012.
International Application No. PCT/EP2012/072593, International Search Report dated Feb. 18, 2013.
International Application No. PCT/EP2012/072588, International Preliminary Report on Patentability dated May 30, 2014.
German Application No. DE 10 2011 118 501.5, German Search Report dated Sep. 20, 2012.
International Application No. PCT/EP2012/072588, International Search Report dated Jul. 5, 2013.
U.S. Appl. No. 13/643,119, Notice of Allowance, May 6, 2016, 9 pages.
U.S. Appl. No. 14/954,560, Notice of Allowance, mailed Aug. 18, 2016, 16 pages.
U.S. Appl. No. 14/357,030, Non-Final Office Action, mailed Sep. 6, 2016, 9 pages.
U.S. Appl. No. 14/357,049, Notice of Allowance, mailed Sep. 7, 2016, 14 pages.

* cited by examiner

ALKYL OR DIALKYL-SEMICARBAZONE AS A HARDENER FOR EPOXY RESIN

PRIOR RELATED APPLICATIONS

This application is a National Phase application of International Application No. PCT/EP2012/072588, filed Nov. 14, 2012, which claims priority to German Patent Application No. 10 2011 118 501.5, filed Nov. 15, 2011, each of which is incorporated herein by reference in its entirety.

The present invention relates to the use of alkyl or dialkyl semicarbazones as curing agents for the curing of epoxy resins and a method for the controlled curing of epoxy resin compositions and epoxy resin compositions.

The use of thermosetting epoxy resins is widespread owing to their good resistance to chemicals, their very good thermal and dynamic-mechanical properties and their high electrical insulating capacity. In addition, epoxy resins exhibit good adhesion to many substrates and are accordingly highly suitable for use in fibre composites. For use in fibre composites, both good wetting of the fibres, that is to say a low viscosity of the chosen resin formulation for producing the composite, and high mechanical properties are desirable.

Various processes are used to produce mouldings from fibre composites, such as, for example, the prepreg process, various infusion or injection processes, in particular the RTM process (resin transfer moulding). Of those processes, the infusion or injection processes in particular have gained importance in recent years. For example, in the infusion processes, in which dry reinforcing materials, such as, for example, fibre mats, nonwovens, fabrics or knitted fabrics, located in an open mould are covered with an impervious vacuum film and, after application of the vacuum, are impregnated with resin formulations by way of distributor channels. These processes have the advantage that large elements with complex geometries can be moulded in a short time.

The curing of epoxy resins takes place by various mechanisms. In addition to curing with phenols or anhydrides, curing is frequently carried out with amines. These substances are mostly liquid and can be mixed with epoxy resins very well. Owing to their high reactivity and accordingly very low latency, such epoxy resin compositions are produced in two-component form. This means that the resin (A component) and the curing agent (B component) are stored separately and are not mixed in the correct ratio until shortly before use. "Latent" here means that a mixture of the individual components is stable under defined storage conditions. These two-component resin formulations are also referred to as cold-curing resin formulations, the curing agents used therefor mostly being chosen from the group of the amines or amidoamines.

One-component, hot-curing epoxy resin formulations, on the other hand, are prefabricated in ready-for-use form, that is to say the epoxy resin and the curing agent are mixed by the manufacturer. Mixing errors of the individual components during use on site are therefore excluded. A precondition thereof are latent curing agent systems, which do not react (are storable) with the epoxy resin at room temperature but react readily when heated, according to the energy input. A particularly suitable and also inexpensive curing agent for such one-component epoxy resin formulations is, for example, dicyandiamide. Under ambient conditions, corresponding resin/curing agent mixtures can be stored ready-for-use for up to 12 months.

Urones have long been known as curing accelerators for the accelerated curing of epoxy resins. Urones are thus used in a large number of applications in combination with latent curing agents such as, for example, dicyandiamide. The use of dicyandiamide as a latent curing agent in combination with a wide variety of urones as curing accelerators is thus also described in a large number of patent applications. Reference may be made in this context, for example, to the following documents: EP 603131 A1, EP 429395 A2, U.S. Pat. Nos. 2,993,044 A, 3,386,956 A, 3,789,071, EP 2295483 A1, WO 2004/106402 A1, WO 2007/062853 A1.

In addition, semicarbazones are known as curing accelerators for the accelerated curing of epoxy resins by means of heat-activatable curing agents such as dicyandiamide. Findings on this subject have shown that these semicarbazones accelerate the curing of epoxy resins by means of heat-activatable latent curing agents analogously to the known urones (unpublished patent application DE 102010020882.5). There is no mention of semicarbazones of formula (I) in the literature as curing agents for curing or cross-linking epoxy resins.

Unfortunately, epoxy resin mixtures with highly latent dicyandiamide or other highly latent curing agents have the disadvantage that such epoxy resin mixtures cure very quickly and with a high heat output, that is to say with the release of large amounts of energy. This effect is all the more marked when dicyandiamide and a curing accelerator, such as, for example, a urone or a semicarbazone, are used for the curing of epoxy resin mixtures. This fact represents a considerable problem for experts concerned with the construction and production of mouldings, because the mouldings, according to the layer thickness, acquire internal stresses with the energy that is released. These internal stresses lead to cracks in the mouldings, as a result of which the mouldings do not achieve the required mechanical stability. Should the heat output according to the layer thickness be much too high, in specific cases, these mouldings are completely unusable.

The use of composite components as a replacement for metal or wood components, such as, for example, in wind power plants, is becoming increasingly more relevant. For example, the manufacturers of wind power plants are planning ever larger units, which are driven by larger rotor blades. In the production of these rotor blades, the heat formed in the production process must be dissipated as effectively and evenly as possible so that the component is not damaged thermally during the production process. This can be ensured only unsatisfactorily when using epoxy resin compositions that comprise as the curing system dicyandiamide as the curing agent and urones or semicarbazones as the curing accelerator, because these systems react very quickly and give off large amounts of heat within a very short time. Although the reaction rate can be controlled to a certain extent by curing at lower temperatures, a build-up of heat as a result of inadequate heat dissipation is very quickly observed in large and solid components having large layer thicknesses of epoxy resins, such as, for example, rotor blades. This has the result that the curing reaction accelerates in an uncontrolled manner. Ultimately, this leads to thermal damage in the component.

For the stress-free production of large and solid structural components, they must be cured as evenly as possible and thus also more slowly. This can be achieved to only a limited extent with the conventional curing systems of dicyandiamide as curing agent and accelerator, because a local build-up of heat and accordingly uneven curing can occur as a result of uneven heat dissipation. This risk is present in particular in the case of irregular components.

The object underlying the present invention is, therefore, to provide new types of curing agents and methods for the controlled curing of epoxy resin compositions, in particular for solid components having large layer thicknesses of epoxy resin, and the epoxy resin compositions required therefor. These new curing agents or methods should allow even curing over a given time period, without internal stresses or other thermal damage taking place in the mouldings or components to be produced.

These objects are achieved by a method and use according to claims 1 and 2 of the present invention.

Therefore, according to a first embodiment, the use of alkyl or dialkyl semicarbazones of the general formula (I) or mixtures thereof as curing agents for curing epoxy resins with at least one reactive epoxy group or of epoxy resin compositions comprising at least one epoxy resin having at least one reactive epoxy group, is the subject matter of the present invention, with

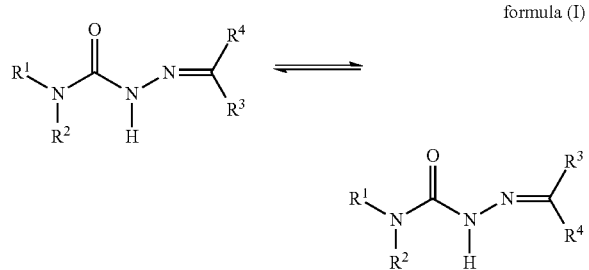

formula (I)

wherein the following, in each case simultaneously or independently of one another, apply to the residues:
$R^1$=branched or linear alkyl or cycloalkyl,
$R^2$=hydrogen, branched or linear alkyl or cycloalkyl,
$R^3$=branched or linear alkyl or cycloalkyl;
$R^4$=hydrogen, branched or linear alkyl or cycloalkyl;
or
$R^1$=branched or linear alkyl or cycloalkyl,
$R^2$=hydrogen, branched or linear alkyl or cycloalkyl,
$R^3$ and $R^4$=together forming an alkylene ring.

According to a second embodiment, a method for the controlled curing of epoxy resin compositions comprising at least one epoxy resin with at least one reactive epoxy group, by means of alkyl or dialkyl semicarbazones of the general formula (I) or mixtures thereof as curing agents, is the subject matter of the present invention, with

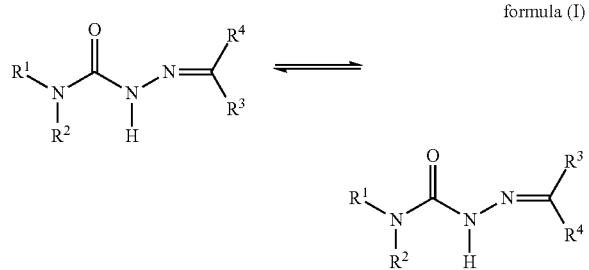

formula (I)

wherein the following, in each case simultaneously or independently of one another, apply to the residues:
$R^1$=branched or linear alkyl or cycloalkyl,
$R^2$=hydrogen, branched or linear alkyl or cycloalkyl,
$R^3$=branched or linear alkyl or cycloalkyl;
$R^4$=hydrogen, branched or linear alkyl or cycloalkyl;
or
$R^1$=branched or linear alkyl or cycloalkyl,
$R^2$=hydrogen, branched or linear alkyl or cycloalkyl,
$R^3$ and $R^4$=together forming an alkylene ring.

Particularly preferred in this case is that in the use or method, the epoxy resin composition does not include any further curing agents, co-curing agents, curing accelerators or other catalysts for curing epoxy resins apart from the alkyl or dialkyl semicarbazones of the general formula (I) or mixtures thereof.

In a preferred embodiment, the epoxy resin composition as a whole does not comprise any further curing agents and/or co-curing agents apart from the alkyl or dialkyl semicarbazones of the general formula (I). In particular, the epoxy resin composition is free of further curing agents and/or co-curing agents. Conventional curing agents and/or co-curing agents are, for example, aliphatic, cycloaliphatic and aromatic amines, polyamines, amidoamines, polyamides, ketimines, mercaptans, isocyanates, anhydrides, carboxylic acids, polyphenols, amino resins and phenolic resins as well as dicyandiamide.

Free of further curing agents and/or co-curing agents means in particular that the system as a whole has a total content of further compounds that can be regarded as curing agents and/or co-curing agents of less than 1 wt. %, based on the total epoxy resin composition, in particular of less than 0.1 wt. %, yet more preferably of less than 0.01 wt. % and particularly preferably of 0 wt. %.

In a further embodiment, the epoxy resin composition according to the invention is free of curing accelerators and/or catalysts for the curing of epoxy resins. Conventional curing accelerators and/or catalysts for the curing of epoxy resins are, for example, tertiary amines, imidazoles, urones, compounds based on boron trifluoride, titanate compounds.

Free of further curing accelerators and/or catalysts for the curing of epoxy resins means in particular that the system as a whole has a total content of further compounds that can be regarded as curing accelerators and/or catalysts for the curing of epoxy resins of less than 1 wt. %, based on the total epoxy resin composition, in particular of less than 0.1 wt. %, yet more preferably of less than 0.01 wt. % and particularly preferably of 0 wt. %.

In the most preferred embodiment, the epoxy resin composition is free of further curing agents, co-curing agents, curing accelerators and other catalysts for the curing of epoxy resins apart from the alkyl or dialkyl semicarbazones of the general formula (I).

Surprisingly, it has become apparent that controlled curing of epoxy resins or epoxy resin compositions by means of alkyl or dialkyl semicarbazones of the general formula (I) or mixtures thereof as curing agents for the curing of epoxy resins, in particular as sole curing agents, i.e. in the absence of further curing agents, co-curing agents, curing accelerators or other catalysts, can be made possible. Intensive tests have additionally shown that epoxy resin compositions can be cured fully in a particularly gentle manner without using heat-activatable curing agents. Therefore alkyl or dialkyl semicarbazones of the general formula (I) or mixtures thereof can be used not only as curing accelerators for the accelerated curing by means of heat-activatable curing agents but also as curing agents per se and in particular as sole curing agents. Therefore, a curing system can be provided with the new types of curing agents which consists of only one component. As a result, adjusting the proportions of curing agents and accelerators prior to the production of the epoxy resin composition and intensive mixing of the composition of curing agents and accelerators is no longer required in the epoxy composition.

In addition, it has surprisingly been shown that alkyl or dialkyl semicarbazones of the general formula (I) or mixtures thereof have comparable curing profiles to known curing agents such as dicyandiamide, but the latencies in epoxy resins or in epoxy resin compositions are not very pronounced. The advantage of these curing agents resides instead in the gentle manner of the curing, wherein compared to known curing agents, less energy is released per unit of time, and this energy can be discharged gently.

Therefore, in addition, a use or a method of the described type is preferred, in which the epoxy resin composition comprises the alkyl or dialkyl semicarbazone of the general formula (I) or mixtures thereof in an amount that, during curing at a temperature of from 60 to 180° C., generates a maximum heat flow in the epoxy resin composition of from 0.05 to 0.99 W/g (based on the mass of the epoxy resin composition), and therefore the epoxy resin composition cures fully.

According to the invention, the epoxy resin composition preferably cures fully. This means in particular that the epoxy resin composition cures to the extent of ≥80%, preferably ≥90%, more preferably ≥95%, yet more preferably ≥98%, in particular ≥99%, and most preferably 100%. Accordingly, the epoxy groups in the cured epoxy resin composition have reacted to the extent of in particular ≥80%, preferably ≥90%, more preferably ≥95%, yet more preferably ≥98%, in particular ≥99% and most preferably 100%.

The proportion of unreacted epoxy groups in the cured epoxy resin composition is in particular <20%, preferably <10%, more preferably <5%, yet more preferably <2%, in particular <1% and most preferably 0%.

Particularly low-stress curing of epoxy resin compositions can thus be made possible. In the mouldings thus produced using a curing agent from the group of semicarbazones, no cracks or other thermal damage can be observed. Curing takes place particularly evenly over a given period of time, as a result of which no local overheating or heat build-up is observed. Accordingly, it is also possible to provide a method for the production of mouldings which ensures a high quality standard in relation to the mouldings to be produced.

The maximum heat flow is measured according to the invention isothermally using a heat flow differential calorimeter (DSC822e, Mettler Toledo) and the peak maximum is determined as the maximum heat flow. Test conditions that are to be observed are mentioned in the examples.

Alternatively or simultaneously, however, the amounts used of the curing agents according to the invention can also be adjusted so that 1 to 15 parts, preferably at least 3 parts and most preferably at least 4 parts of curing agent are used to 100 parts of resin, wherein also simultaneously or independently of one another, in particular at most 12 parts, more particularly at most 10 parts and most preferably at most 8 parts are used. A combination of a plurality of curing agents according to the invention or a combination is also covered by this invention.

The total amount of curing agents of the formula (I) according to the invention is in particular 1-15 parts, preferably 2-15 parts, more preferably 2-12 parts, yet more preferably 3-12 parts, particularly preferably 4-12 parts, and yet more preferably 5-12 parts to 100 parts of resin. In this case, resin is understood to mean the total amount of epoxy resin.

In a further preferred embodiment, the amount used of curing agents of the formula (I) according to the invention is 3-12, more particularly 4-12, preferably 4-10, and yet more preferably 4-8 parts per 100 parts of resin.

The curing of the epoxy resins using the curing agents according to the invention generally takes places at temperatures of from 60° C. to 180° C. The selection of the curing temperature is dependent on the specific processing and product requirements and can be varied in the formulation particularly by regulating the quantity of curing agent and by adding additives. In this case, the manner in which energy is supplied to the resin formulations is unimportant. For example, it can be supplied in the form of heat from an oven or heating elements, but also by means of infrared radiators or stimulation by microwaves or other radiation.

The curing profile of the formulations according to the invention can be varied by the addition of further commercially available additives, as are known to a person skilled in the art for the curing of epoxy resins.

Additives for improving the processability of the uncured epoxy resin compositions or for adapting the thermo-mechanical properties of the thermosetting products to the requirements profile include, for example, reactive diluents, fillers, rheology additives such as thixotropic agents or dispersing additives, defoamers, colourants, pigments, impact modifiers, impact improvers or fireproofing additives.

In connection with the present invention, an alkyl or dialkyl semicarbazone is to be understood as being a substance which has the structure represented by formula (I).

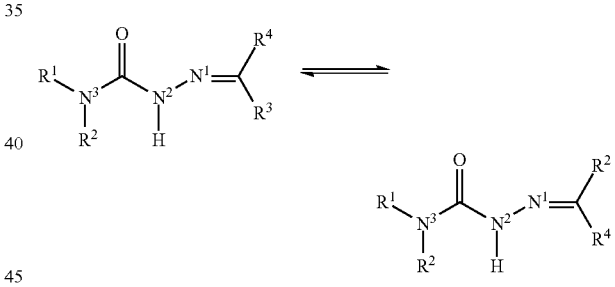

In this case, an alkyl or dialkyl semicarbazone according to the present invention always comprises at least one alkyl or cycloalkyl substituent on $N^3$ (nitrogen of the semicarbazone group adjacent to the carbonyl group). Correspondingly, the residue $R^1$ in the compounds according to the invention of general formula (I) represents branched or linear alkyl or cycloalkyl, but not hydrogen ($R^1 \neq H$). $R^2$ can mean hydrogen. In this case, an alkyl or cycloalkyl residue is located on the $N^3$ nitrogen. In a further embodiment, $R^2$ can mean branched or linear alkyl or cycloalkyl. In this embodiment, two alkyl or cycloalkyl groups are located on $N^3$.

In addition, the carbon of the semicarbazone group, which is adjacent to the nitrogen $N^1$ (nitrogen of the semicarbazone group, adjacent to $N^2$), always comprises at least one alkyl or cycloalkyl substituent. Correspondingly, the residue $R^3$ means branched or linear alkyl or cycloalkyl, but not hydrogen ($R^3 \neq H$). The residue $R^4$ can represent hydrogen. In this case, a branched or linear alkyl residue or cycloalkyl residue is located on the carbon of the semicarbazone group. In addition, $R^4$ can represent branched or linear alkyl or cycloalkyl. In this case, the carbon of the semicarbazone group comprises two alkyl residues or cycloalkyl residues. The nitrogen $N^2$ (nitrogen of the semicarbazone group between the carbonyl group and the —N=C-group) always comprises a hydrogen substituent. However, it can also be provided that the substituents $R^3$ and $R^4$ together form an alkylene ring with the stated definition. The substituents $R^1$ to $R^4$ can vary widely in the given definitions.

Structurally, the semicarbazones can be present both as geometric isomers ((Z)-isomers, (E)-isomers) or in the respective tautomeric forms (keto-enol-tautomers). According to the residues $R^1$ to $R^4$, the compounds are obtained in solid, semi-solid or liquid-oil form. The substitution pattern also determines the solubility of the semicarbazones in solvents or in epoxy resins.

According to the present invention, in particular such alkyl or dialkyl semicarbazones of the general formula (I) or mixtures thereof can be used as curing agents for which the following simultaneously or independently apply:

$R^1$=branched or linear C1- to C6-alkyl or C1- to C6-cycloalkyl, $R^2$=hydrogen, branched or linear C1- to C6-alkyl or C1- to C6-cycloalkyl, $R^3$=branched or linear C1- to C6-alkyl or C1- to C6-cycloalkyl, $R^4$=hydrogen, branched or linear C1- to C6-alkyl or C1- to C6-cycloalkyl;

or $R^1$=branched or linear C1- to C6-alkyl or C1- to C6-cycloalkyl, $R^2$=hydrogen, branched or linear C1- to C6-alkyl or C1- to C6-cycloalkyl, $R^3$ and $R^4$=together forming an alkylene ring.

Alkyl or C1- to C6-alkyl can be in particular methyl, ethyl, propyl (n-propyl), methylethyl (iso-propyl), butyl (n-butyl), 2-methylpropyl (iso-butyl), 1-methylpropyl (sec-butyl), 1,1-dimethylethyl, (tert-butyl), pentyl, 1-methylbutyl, 2-methylbutyl, 3-methylbutyl, 2,2-dimethylpropyl, 1,2-dimethylpropyl, 1,1-dimethylpropyl, 1-ethylpropyl, hexyl, 1-methypentyl, 2-methylpentyl, 3-methylpentyl, 4-methylpentyl, 1,1-dimethylbutyl, 2,2-dimethylbutyl, 3,3-dimethylbutyl, 1-ethylbutyl, 2-ethylbutyl, 1-methyl-1-ethylpropyl, 1-ethyl-2-methylpropyl or 1,1,2-trimethylpropyl.

Particularly preferred are compounds according to formula (I) with (simultaneously or independently of one another) $R^1$=methyl or ethyl, $R^2$=methyl or ethyl, and $R^3$=methyl, ethyl, propyl or iso-propyl and $R^4$=methyl, ethyl, propyl or methylethyl (iso-propyl).

According to the present invention, $R^3$ and $R^4$ can also mean together forming an alkylene ring, in particular C2- to C11-alkylene, and further preferably alkylene or C2- to C11-alkylene each with the general formula —$(CH_2)_n$— where $2 \leq n \leq 11$, in particular —$(CH_2)_n$— where $2 \leq n \leq 6$. In particular, it can be provided in this case that $R^3$ and $R^4$ together are ethylene, propylene, butylene, pentylene or hexylene, it being possible to optionally mono-substitute or poly-substitute said alkylene residues, in particular C1- to C6-alkyl, in turn with alkyl residues. In this case, $R^3$ and $R^4$ together preferably have the formula —$(CHR^5)_n$—, wherein $R^5$ at every occurrence is, independently of one another, H or C1- to C6-alkyl.

In the context of the present invention, in addition, cycloalkyl should be understood to be in particular a monocyclic cycloalkyl residue with 3 to 7 carbon atoms (C3- to C7-cycloalkyl), in particular a cycloalkyl or C3- to C7-cycloalkyl substituent which has the general formula $C_nH_{2n-1}$ where n=3 to 7. Also preferably, cycloalkyl or C3- to C7-cycloalkyl can denote cyclopropyl, cyclobutyl, cyclopentyl, cyclohexyl or cycloheptyl, wherein these cycloalkyl residues can themselves also preferably be mono- or poly-substituted by C1- to C6-alkyl residues having the meaning given above.

The production of semicarbazones is described in the literature. The substitution pattern varies widely. A conventional method for the production is synthesis proceeding from semicarbazides with ketones or aldehydes. Here, the substitution pattern of the semicarbazones is determined by the reagents used, wherein the residues $R^1$ and $R^2$ are determined by substituents of the semicarbazide used and the substituents $R^3$ and $R^4$ are determined by the aldehyde used or the ketone. The synthetic access to semicarbazides is also described in the literature. In this way, for example the 4,4-dimethylsemicarbazide ($R^1$=$R^2$=methyl) and also the 4,4-diethylsemicarbazide ($R^1$=$R^2$=ethyl) can be produced according to C. Vogelesang (*Rec. Tray. Chim.* 1943, 62, 5) or as described in WO 98/47869. Analogously, further semicarbazides can be obtained by reacting hydrazine with suitable carbamoyl chlorides. The semicarbazides obtained in this manner can be converted into the desired semicarbazones according to formula (I) in a next step by reaction with appropriate aldehydes or ketones (cf. also Glöckler-Zur Chemie der 1,3,4-Oxadiazoliumsalze, Wissenschaftliche Arbeit im Fach Chemie an der Universität Konstanz [on the chemistry of 1,3,4-oxadiazolium salts, scientific work in the chemistry department at the University of Konstanz], June 1994).

As an example, and in a non-limiting manner, the following are used as preferred agents for the alkyl or dialkyl semicarbazones of the general formula (I) according to the invention: acetone-4,4-dimethylsemicarbazone (Ac-DMS), methylethylketone-4,4-dimethylsemicarbazone (MEK-DMS), dicyclopropylketone-4,4-dimethylsemicarbazone (DCyPr-DMS), methylisobutylketone-4,4-dimethylsemicarbazone (MIBK-DMS), cyclopentanone-4,4-dimethylsemicarbazone (CyPn-DMS), cyclohexanone-4,4-dimethylsemicarbazone (CyHxDMS), acetone-4,4-diethylsemicarbazone (Ac-DES) or cyclopentanone-4,4-diethylsemicarbazone (CyPn-DES).

With regard to the epoxy resins or epoxy resin compositions comprising at least one epoxy resin to be cured, the present invention is not subject to any restrictions. In particular, all commercially available products are possible that conventionally comprise one or more than one 1,2-epoxy group (oxirane) and can be saturated or unsaturated, aliphatic, cycloaliphatic, aromatic or heterocyclic. The epoxy resins can additionally contain substituents such as halogens, phosphorus groups and hydroxyl groups. Epoxy resins based on glycidyl polyether of 2,2-bis(4-hydroxyphenyl)-propane (bisphenol A) and the bromine-substituted derivative (tetrabromobisphenol A), glycidyl polyether of 2,2-bis (4-hydroxyphenyl)methane (bisphenol F) and glycidyl polyether of novolak resins as well as those based on aniline or substituted anilines such as, for example, p-aminophenol or 4,4'-diaminodiphenylmethanes can be cured particularly well by using the curing agents according to the invention or in a method according to the invention.

Thus, in a development of the present invention, epoxy resin compositions comprising a) at least one epoxy resin having at least one reactive epoxy group and b) at least one curing agent according to general formula (I) and/or the above-described type are also the subject matter of the present invention. Thus, an epoxy resin composition, in particular for the production of composites or mouldings, is also the subject matter of this invention, which includes:

a) an epoxy resin having at least one reactive epoxy group,
b) at least one curing agent from the group of the alkyl or dialkyl semicarbazones of the general formula (I) or mixtures thereof

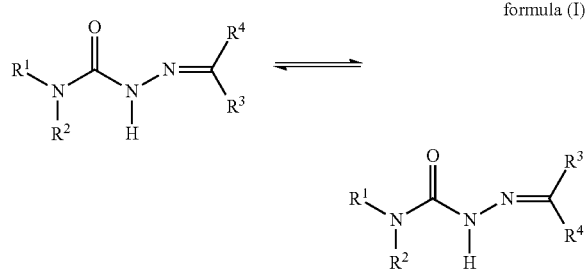

formula (I)

wherein the following, in each case simultaneously or independently of one another, apply to the residues:
$R^1$=branched or linear alkyl or cycloalkyl,
$R^2$=hydrogen, branched or linear alkyl or cycloalkyl,
$R^3$=branched or linear alkyl or cycloalkyl;
$R^4$=hydrogen, branched or linear alkyl or cycloalkyl; or
$R^1$=branched or linear alkyl or cycloalkyl,
$R^2$=hydrogen, branched or linear alkyl or cycloalkyl,
$R^3$ and $R^4$=together forming an alkylene ring.

Particularly preferred is an epoxy resin composition which does not include any further curing agents, co-curing agents, curing accelerators or other catalysts for the curing of epoxy resins apart from the alkyl or dialkyl semicarbazones of the general formula (I) or mixtures thereof. Further preferably, this epoxy resin composition includes an epoxy resin having at least one reactive epoxy group from the group of epoxy resins based on glycidyl polyether of 2,2-bis(4-hydroxyphenyl)propane (bisphenol A), its bromine-substituted derivative (tetrabromobisphenol A), glycidyl polyether of 2,2-bis(4-hydroxyphenyl)-methane (bisphenol F) and/or glycidyl polyether of novolak resins.

According to a particularly preferred embodiment of the present invention, the epoxy resin composition comprises the curing agent from the group of the alkyl or dialkyl semicarbazones of the general formula (I) or mixtures thereof in an amount that, during curing at a temperature of from 60 to 180° C., generates a maximum heat flow in the epoxy resin composition of from 0.05 to 0.99 W/g (based on the mass of the epoxy resin composition), and therefore the epoxy resin composition cures fully.

Particularly surprisingly, it has been established that an epoxy resin composition can thus be provided which allows particularly low-stress curing and is thus particularly suitable for the production of composites or mouldings. In the mouldings thus produced using a curing agent from the group of semicarbazones, no cracks or other thermal damage can be observed. Curing takes place particularly evenly over a given period of time, as a result of which no local overheating or heat build-up is observed. Accordingly, it is also possible to provide an epoxy resin composition for the production of mouldings which ensures a high quality standard in relation to the mouldings to be produced.

According to a preferred epoxy resin composition or the method or use described herein, it is in particular also provided according to the present invention that the epoxy resin composition comprises the curing agents from the group of the alkyl or dialkyl semicarbazones of the general formula (I) or mixtures thereof in an amount that, during curing at a temperature of from 60 to 180° C., in particular from 60 to 160° C. and most particularly preferably from 60 to 150° C., generates a maximum heat flow in the epoxy resin composition of from 0.05 to 0.99 W/g (based on the mass of the epoxy resin composition), and therefore the epoxy resin composition cures fully. It can, however, also be provided that the epoxy resin composition comprises the curing agents from the group of the alkyl or dialkyl semicarbazones of the general formula (I) or mixtures thereof in an amount that, during curing at a temperature of from 80 to 160° C., in particular from 90 to 160° C. and most particularly preferably from 90 to 140° C., generates a maximum heat flow in the epoxy resin composition of from 0.05 to 0.99 W/g (based on the mass of the epoxy resin composition), and therefore the epoxy resin composition cures fully.

Simultaneously or independently thereof, it can be provided that the amount of curing agents from the group of the alkyl or dialkyl semicarbazones of the general formula (I) or mixtures thereof is adjusted such that a maximum heat flow is generated in the epoxy resin composition of from 0.05 to 0.99 W/g, in particular from 0.05 to 0.80 W/g, particularly preferably from 0.05 to 0.70 W/g and most particularly preferably from 0.05 to 0.60 W/g (based on the mass of the epoxy resin composition), and therefore the epoxy resin composition cures fully.

The majority of the described semicarbazones according to general formula (I), such as acetone-4,4-dimethylsemicarbazone, cyclopentanone-4,4-dimethylsemicarbazone or cyclohexanone-4,4-dimethylsemicarbazone, are solids. Due to their good solubility properties in epoxy resins, these curing agents are particularly suitable for the curing of epoxy resins or epoxy resin compositions in composites which are used in prepreg technology. Due to their good solubility properties, however, these semicarbazones are also optimally suitable for the production of solid composite components and mouldings in the infusion or injection process.

Surprisingly, however, it was also found that the liquid dimethyl semicarbazones such as methyl-ethylketone-4,4-dimethylsemicarbazone and methylisobutylketone-4,4-dimethylsemicarbazone do not only react with epoxy resin in a very low concentration as curing agents at low temperatures, between 70 and 100° C., but they also release very little heat per unit of time. These curing agents are thus particularly suitable for the production of solid composite components and mouldings in the infusion or injection process. Overall, these epoxy resin compositions including alkyl or dialkyl semicarbazones of the general formula (I) or mixtures thereof are thus particularly suitable for the production of composites and mouldings. In particular, these epoxy resin compositions are suitable for use in prepreg processes, various infusion or injection processes, and in particular in this case in the RTM process.

Therefore, the use of the curing agents according to the invention from the group of the alkyl or dialkyl semicarbazones of the general formula (I) or mixtures thereof, and the use thereof in a curing method of fibrous materials, nonwovens, fabrics, knitted fabrics or meshes which are impregnated or coated with epoxy resin or epoxy resin compositions are the subject matter of the present invention.

Due to the good to very good heat flows and also even and controlled curing of the epoxy resin compositions, the curing agents according to the invention from the group of the semicarbazones are optimally suitable for the production of cured mouldings, in particular hollow articles, having a layer thickness or wall of from 0.5 to 500 mm, in particular of from 5 mm to 400 mm, in particular for the production of mouldings by means of infusion or injection processes.

Therefore, according to a particular embodiment, the use of alkyl or dialkyl semicarbazone of the general formula (I) or mixtures thereof as curing agents for the curing of epoxy resin compositions including at least one epoxy resin having at least one reactive epoxy group, or a method for the curing of epoxy resin compositions including at least one epoxy resin having at least one reactive epoxy group using alkyl or dialkyl semicarbazone of the general formula (I) or mixtures thereof as curing agents is also the subject matter of the present invention, in which the epoxy resin composition has a layer thickness of at least 0.5 mm, in particular at least 2 mm, in particular at least 10 mm, particularly preferably at least 20 mm and most preferably of at least 50 mm. At the same time or independently thereof, the layer thickness can be at most 500 mm.

Finally, a composite material which includes a reinforcing material, in particular a fibrous material or nonwoven, fabric, knitted fabric or mesh of carbon fibres or glass fibres, and an epoxy resin composition of the type and features described here, is thus also the subject matter of the present invention.

Owing to the advantageous properties of the curing agents according to the invention and the cost-effective production thereof, and, as a result, an advantageous cost-benefit ratio, said curing agents are particularly suitable for industrial use.

The present invention is explained in the following with reference to examples, but the invention is not to be interpreted as being reduced to the examples. Instead, the present invention likewise encompasses any combination of preferred embodiments.

EXAMPLES

A) Resins Used
As Epoxy Resin was Used:

| Name | Reference number | EEW | CAS No. |
|---|---|---|---|
| Bisphenol A - liquid resin | Epikote 828 | 182-187 | [25068-38-6] | average molecular weight <= 700
Hexion Speciality Chemicals

B) General Production of Semicarbazones According to Formula (I)

a) Synthesis of the Semicarbazides

The synthetic access to 4,4-dimethylsemicarbazide ($R^1=R^2=$methyl—(II)) and also to 4,4-diethylsemicarbazide ($R^1=R^2=$ethyl —(III)) takes place by means of methods known from the literature such as those published by C. Vogelesang (*Rec. Tray. Chim.* 1943, 62, 5) or in WO 98/47869. As is illustrated by way of the example 26 of the patent specification WO 98/47869, in order to produce 4,4-dimethylsemicarbazide (II), equimolar amounts of hydrazine hydrate and dimethylcarbamoyl chloride are reacted in drops in the solvents ethanol and diethyl ether with ice bath cooling and are then reacted further for an hour with ice bath cooling. After filtration of the precipitated solid, concentrating the reaction mixture results in the target compound (II) in the form of a white, crystalline solid.

b) Synthesis of the Semicarbazones

In the following, the semicarbazides produced according to a) are converted into the desired semicarbazones using ketones. Once again, picked as an example is the illustration of the generally applicable conversion of the semicarbazides (II) or (III) into the semicarbazones according to the invention using the example of the cyclopentanone-4,4-dimethylsemicarbazone ($R^1=R^2=$methyl; $R^3$ and $R^4=$ —$(CH_2)_4$—). According to Glöckler (Zur Chemie der 1,3,4-Oxadiazoliumsalze, Wissenschaftliche Arbeit im Fach Chemie an der Universität Konstanz [on the chemistry of 1,3,4-oxadiazolium salts, scientific work in the chemistry department at the University of Konstanz], June 1994), for this purpose, cyclopentanone in five-fold excess is reacted with the semicarbazide (II) in boiling ethanol. After 45 minutes, the reaction is complete and after evaporating the solvent and the excess ketone, a colourless to slightly yellowish powder is obtained by stirring the residue under ice-cold pentane. The structure and composition has been confirmed by IR and NMR ($^1H$, $^{13}C$)-spectroscopic investigations and by CHN analysis.

The semicarbazones mentioned here are produced analogously.

C) Curing agents According to the Invention

| Name | Reference number | CAS No. |
|---|---|---|
| Acetone-4,4-dimethylsemicarbazone | Ac-DMS | [130652-43-6] |
| $C_6H_{13}N_3O$ (143.19)   prep. C 50.33% | H 9.15% | N 29.35% |
|                            found C 48.97% | H 9.02% | N 28.47% |
| Methylethylketone-4,4-dimethylsemicarbazone | MEK-DMS | [no CAS No.] |
| $C_7H_{15}N_3O$ (157.21)   prep. C 53.48% | H 9.62% | N 26.73% |
|                            found C 53.88% | H 9.70% | N 25.48% |
| Methylisobutylketone-4,4-dimethylsemicarbazone | MIBK-DMS | [no CAS No.] |
| $C_9H_{19}N_3O$ (185.27)   prep. C 58.35% | H 10.34% | N 22.68% |
|                            found C 57.71% | H 10.76% | N 22.30% |
| Cyclopentanone-4,4-dimethylsemicarbazone | CyPn-DMS | [no CAS No.] |
| $C_8H_{15}N_3O$ (169.22)   prep. C 56.78% | H 8.93% | N 24.83% |
|                            found C 56.72% | H 8.96% | N 24.83% |
| Cyclohexanone-4,4-dimethylsemicarbazone | CyHx-DMS | [no CAS No.] |
| $C_9H_{17}N_3O$ (183.25)   prep. C 58.99% | H 9.35% | N 22.93% |
|                            found C 58.21% | H 9.05% | N 23.22% |
| Acetone-4,4-diethylsemicarbazone | Ac-DES | [14850-53-4] |
| $C_8H_{17}N_3O$ (171.24)   prep. C 56.11% | H 10.01% | N 24.54% |
|                            found C 55.68% | H 10.49% | N 24.33% |

D) Composition Comprising Epoxy Resin Compositions According to the Invention The invention is shown here using the example of an epoxy resin composition having the following proportions:

Epikote 828 (100 parts):curing agent (7 parts)

E) Investigations i) Producing the Sample

In order to prepare the resin/curing agent formulation, the components were weighed into the porcelain mortar in the stated ratios and mixed thoroughly and homogenously by hand.

ii) Determining the Gel Time

Approximately 700-800 mg of the freshly prepared sample were weighed into an aluminium crucible, which was carried out in a heating block that was pre-tempered to the stated temperature (start of the time measurement). The examination of gelation took place by means of a wooden stick which was dipped into the liquid resin. If a rigid strand resulted during the pulling out (no more dripping), this time was defined as gel time.

iii) Carrying Out the DSC Measurements by Means of a Heat Flow Differential Calorimeter (DSC822e, Mettler Toledo):

a) dynamically: as the temperature programme for determining the peak temperature (DSC peak T), heating from 30 to 250 (if required to 400° C.) is carried out at a rate of 10 K/min. The onset temperature is determined from the same measurement by applying the tangent to the reaction peak. The energy content is calculated from the same measurement by integration of the area under the peak.

b) isothermally: in order to determine the isothermal reaction time and the maximum heat flow (peak in the case of isothermal DSC measurement at a given temperature), the sample is heated from 30° C. to the indicated desired temperature T at a rate of 20 K/min and then kept constant for time t. The reaction is complete when the heat flow has reached the base line at the given temperature again after the maximum. In the evaluation of the change over time, the positive peak corresponds to the maximum heat flow of the curing reaction. The integrated area under the peak of the same measurement is the energy content of the reaction. The onset temperature is determined from the same measurement by applying the tangent to the reaction peak.

iv) Measuring the Glass Transition Temperature by Means of DSC (Final-Tg)

In order to determine the maximum achievable glass transition temperature (Final-Tg) the pre-gelled sample from the determination of the gel time was used. The sample was fully cured by heating to 200° C. (DSC temperature programme: 20 to 200° C., heating rate 20 K/min) and maintaining the temperature for 30 min. After cooling to 30° C., the sample was reheated from 30 to 200° C. with a heating rate of 10 K/min and the Tg was determined from the heating curve by applying the tangent in the inflection point of the greatest change in the heat capacity ($\Delta Cp$).

v) Carrying Out the Latency Experiments

In order to determine the latency (storage stability), approximately 10 g of the sample was freshly prepared and tempered in an oven at the stated temperature. As a measurement of the continuing cross-linking (curing) of the epoxy resin mass, the dynamic viscosity of a sample was determined in a cone(1°)-plate rheometer at 25° C. at the time of each measurement.

The evaluation of the experiments took place by plotting the percentage increase in viscosity (%) over time in hours (h) or days (d) and extrapolating the individual data by means of an exponential or potential mathematical function.

vi) Carrying Out the Infusion—Composition:

| Fibre composite - composition | | |
|---|---|---|
| Component | Material | Size and number |
| Base layer | R&G vacuum film no. 390160 | 15 × 26 cm |
| Seal | Tacky Tape SM5126-½" × X⅛" | approx. 85 cm |
| Release film (lower) | Nylon Peel ply (plain weave 64 g/m$^3$) offset | 10 × 19 cm |
| Laminate (fibreglass) | Atlas FK 144 (296 g/m$^3$) | 7 × 17 cm (3 layers) |
| Release film (upper) | Nylon Peel ply (plain weave 64 g/m$^3$) offset | 10 × 19 cm |
| Release film | R&G separating film no. 390190 | 11 × 22 cm |
| Ventilation film (breather) | R&G non-woven no. 390180 | 10 × 19 cm + 2 × (3 × 5 cm) |
| Vacuum mesh | Ventilation mesh 150 g/m$^3$ (direction of movement - black) | 8 × 8 cm |
| Vacuum film | R&G vacuum film no. 390160 | 19 × 31 cm |
| Tubings | PVC, clear (3.0 mm internal diameter, 5.0 mm external diameter) | 2 × 45 cm |

Observations: infusion mixture heated to 40°-44° C.; composition was cured on a heating plate The curing agent mixture is firstly heated to 40° C. (lowering the viscosity) and then drawn into the glass-fibre composition (three glass-fibre layers having a layer thickness of approx. 0.27 mm) by means of a vacuum pump (approx. 12 mbar). The diaphragm vacuum pump is switched off once the entire glass-fibre composition is impregnated plus a minute of further suction time. The impregnated component is cured on a heating plate at 100° C. for several hours.

vii) Analytical Instruments Used

| | | |
|---|---|---|
| Gel time | Heating block | VLM 2.0 HT |
| DSC measurements | DSC device | Mettler-Toledo DSC 822 |
| Viscosity | Rheometer | Haake RheoStress 1 | viii) Determining Gel Time, Dynamic DSC and Final Tg and Latencies at 23° C.

TABLE 1 gel time, dynamic DSC and final Tg

| Curing agent [parts] | Gel time at 140° C. [min:sec] | DSC peak temperature [° C.] | Final Tg (DSC) [° C.] | Isothermal peak (DSC) [°C./min:sec] | max. heat flow (Isothermal DSC) [° C./Wg$^{-1}$] |
|---|---|---|---|---|---|
| Ac-DMS (7.0 parts) | 32:00 | 182.2 | 86.4 | 100/25:15 | 100/0.11 |
| MEK-DMS (7.0 parts) | 29:00 | 183.1 | 83.9 | 100/18:50 | 100/0.075 |
| MIBK-DMS (7.0 parts) | 29:30 | 192.1 | 88.7 | 100/24:15 | 100/0.06 |

TABLE 2

Latency at 23° C. in days (d)

| Curing agent | Percentage increase in the viscosity as a measure of the latency | | | | |
|---|---|---|---|---|---|
| (parts) | 20% | 50% | 100% | 300% | solid |
| Ac-DMS (7.0 parts) | 0.5 d | 1 d | 3 d | 7 d | >18 d |
| MEK-DMS (7.0 parts) | 0.5 d | 1 d | 2 d | 4 d | >14 d |
| MIBK-DMS (7.0 parts) | 0.5 d | 2 d | 4 d | 9 d | >21 d | ix) Curing Composites by Means of Infusion Processes

TABLE 3 infusion

| Curing agent [parts] | Infusion time [min] | Curing time [hrs.] | Cold Tg [° C.] | Thickness of the component [mm] | Fibre content of the component [%] |
|---|---|---|---|---|---|
| Ac-DMS (7.0 parts) | 2 | 5.5 | 104 | 0.81 | 67 |
| MEK-DMS (7.0 parts) | 3 | 5.5 | 96 | 0.82 | 68 |
| MIBK-DMS (7.0 parts) | 3 | 5.5 | 97 | 0.81 | 67 |

The invention claimed is:

1. A method of controlled curing of epoxy resin compositions comprising:

(i) providing at least one epoxy resin having at least one reactive epoxy group, (ii) providing at least one alkyl or dialkyl semicarbazone of general formula (I),

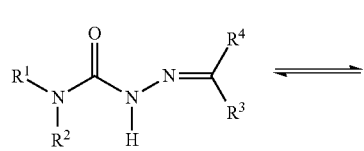

formula (I)

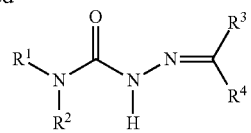

-continued wherein the following, in each case simultaneously or independently of one another, apply to the residues:

$R^1$=branched or linear alkyl or cycloalkyl;
$R^2$=hydrogen, branched or linear alkyl or cycloalkyl;
$R^3$=branched or linear alkyl or cycloalkyl;
$R^4$=hydrogen, branched or linear alkyl or cycloalkyl;
or
$R^1$=branched or linear alkyl or cycloalkyl;
$R^2$=hydrogen, branched or linear alkyl or cycloalkyl; and,
$R^3$ and $R^4$=together forming an alkylene ring; and, (iii) curing the epoxy resin provided in step (i) using the alkyl or dialkyl semicarbazone of the general formula (I) provided in step (ii) as a curing agent.

2. The method of claim 1, wherein the epoxy resin composition does not comprise any further curing agents, co-curing agents, curing accelerators or other catalysts for the curing of epoxy resins apart from the alkyl or dialkyl semicarbazones of the general formula (I) or mixtures thereof.

3. The method of claim 1, wherein the epoxy resin composition comprises the alkyl or dialkyl semicarbazones of the general formula (I) or mixtures thereof in an amount which, during curing at a temperature of from 60 to 180° C., generates a maximum heat flow in the epoxy resin composition of from 0.05 to 0.99 W/g (based on the mass of the epoxy resin composition), and therefore the epoxy resin composition cures fully.

4. The method of claim 1, wherein an alkyl or dialkyl semicarbazones according to formula (I), acetone-4,4-dimethylsemicarbazone, methylethylketone-4,4,-dimethylsemicarbazone, dicyclopropylketone-4,4-dimethylsemicarbazone, methylisobutylketone-4,4-dimethylsemicarbazone, cyclopentanone-4,4-dimethylsemicarbazone, cyclohexanon-4,4-dimethylsemicarbazone, aceton-4,4-diethylsemicarbazone or cyclopentanone-4,4-diethylsemicarbazone is used.

5. The method of claim 1, wherein the epoxy resin is selected from the group consisting of epoxy resins based on glycidyl polyethers of 2,2-bis(4-hydroxyphenyl)propane (bisphenol A), glycidyl polyethers of bromine-substituted derivative of 2,2-bis(4-hydroxyphenyl)propane (tetrabromobisphenol A), glycidyl polyethers of 2,2-bis(4-hydroxyphenyl)-methane (bisphenol F), glycidyl polyethers of novolak resins, glycidyl polyethers of aniline, glycidyl polyethers of substituted anilines, glycidyl polyethers of p-aminophenol and glycidyl polyethers of 4,4'-diaminodiphenylmethane.

6. The method of claim 1, wherein fibrous materials, fabrics, knitted fabrics or meshes impregnated or coated with epoxy resin or epoxy resin compositions are used.

7. The method of claim 1 for producing moldings, in particular hollow articles, having a layer thickness or wall of from 0.5 to 500 mm.

8. An epoxy resin composition for the production of moldings, comprising:
a) an epoxy resin having at least one reactive epoxy group; and,
b) at least one curing agent from the group of the alkyl or dialkyl semicarbazones of the general formula (I) or mixtures thereof,

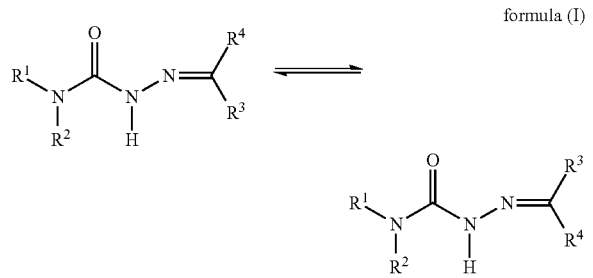

formula (I)

wherein the following, in each case simultaneously or independently of one another, apply to the residues:
$R^1$=branched or linear alkyl or cycloalkyl;
$R^2$=hydrogen, branched or linear alkyl or cycloalkyl;
$R^3$=branched or linear alkyl or cycloalkyl; and,
$R^4$=hydrogen, branched or linear alkyl or cycloalkyl;
or
$R^1$=near alkyl or cycloalkyl;
$R^2$=hydrogen, branched or linear alkyl or cycloalkyl; and,
$R^3$ and $R^4$=together forming an alkylene ring.

9. The epoxy resin composition of claim 8, wherein the epoxy resin composition does not include any further curing agents, co-curing agents, curing accelerators or other catalysts for the curing of epoxy resins apart from the alkyl or dialkyl semicarbazones of the general formula (I) or mixtures thereof.

10. The epoxy resin composition of claim 8, wherein the epoxy resin is selected from the group consisting of epoxy resins based on glycidyl polyethers of 2,2-bis(4-hydroxyphenyl)propane (bisphenol A), glycidyl polyethers of bromine-substituted derivative of 2,2-bis(4-hydroxyphenvl)propane (tetrabromobisphenol A), glycidyl polyethers of 2,2-bis(4-hydroxyphenyl)-methane (bisphenol F), glycidyl polyethers of novolak resins, glycidyl polyethers of aniline, glycidyl polyethers of substituted anilines, glycidyl polyethers of of p-aminophenol and glycidyl polyethers of 4,4'-diamonidiphenylmethane.

11. The epoxy resin composition of claim 9, wherein the epoxy resin is selected from the group consisting of epoxy resins based on glycidyl polyethers of 2,2-bis(4-hydroxyphenyl)propane (bisphenol A), glycidyl polyethers of bromine-substituted derivative of 2,2-bis(4-hydroxyphenvl)propane (tetrabromobisphenol A), glycidyl polyethers of 2,2-bis(4-hydroxyphenyl)-methane (bisphenol F), glycidyl polyethers of novolak resins, glycidyl polyethers of aniline, glycidyl polyethers of substituted anilines, glycidyl polyethers of of p-aminophenol and glycidyl polyethers of 4,4'-diamonidiphenylmethane.

12. The epoxy resin composition of claim 8, wherein the epoxy resin composition includes the alkyl or dialkyl semicarbazones of the general formula (I) or mixtures thereof in an amount which, during curing at a temperature of from 60 to 180° C., generates a maximum heat flow in the epoxy resin composition of from 0.05 to 0.99 W/g (based on the mass of the epoxy resin composition) and therefore the epoxy resin composition cures fully.

13. The epoxy resin composition of claim 9, wherein the epoxy resin composition includes the alkyl or dialkyl semicarbazones of the general formula (I) or mixtures thereof in an amount which, during curing at a temperature of from 60 to 180° C., generates a maximum heat flow in the epoxy resin composition of from 0.05 to 0.99 W/g (based on the mass of the epoxy resin composition) and therefore the epoxy resin composition cures fully.

14. The epoxy resin composition of claim 10, wherein the epoxy resin composition includes the alkyl or dialkyl semicarbazones of the general formula (I) or mixtures thereof in an amount which, during curing at a temperature of from 60 to 180° C., generates a maximum heat flow in the epoxy resin composition of from 0.05 to 0.99 W/g (based on the mass of the epoxy resin composition) and therefore the epoxy resin composition cures fully.

15. A composite material comprising a reinforcing material and the epoxy resin composition of claim 8.

16. A composite material comprising a reinforcing material and the epoxy resin composition of claim 9.

17. A composite material comprising a reinforcing material and the epoxy resin composition of claim 10.

18. A composite material comprising a reinforcing material and the epoxy resin composition of claim 11.

19. The composite material of claim 12, wherein the composite material comprises as a reinforcing material a fibrous material or a nonwoven, fabric, knitted fabric or mesh consisting of carbon fibres or glass fibres.

* * * * *